United States Patent
Ichimura

(10) Patent No.: US 7,180,720 B2
(45) Date of Patent: Feb. 20, 2007

(54) FAILURE DETECTION DEVICE FOR HYDRAULIC MOTOR AND HYDRAULIC DRIVE VEHICLE

(75) Inventor: Kazuhiro Ichimura, Niihari-gun (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 375 days.

(21) Appl. No.: 10/466,451

(22) PCT Filed: Jan. 19, 2001

(86) PCT No.: PCT/JP01/00369

§ 371 (c)(1),
(2), (4) Date: Jul. 16, 2003

(87) PCT Pub. No.: WO02/057663

PCT Pub. Date: Jul. 25, 2002

(65) Prior Publication Data

US 2004/0052030 A1    Mar. 18, 2004

(51) Int. Cl.
*F16D 31/02* (2006.01)

(52) U.S. Cl. .................................. 361/178; 60/403

(58) Field of Classification Search ............... 361/160, 361/178, 179, 186; 60/403, 406, 420
See application file for complete search history.

(56) References Cited

U.S. PATENT DOCUMENTS

| 3,661,060 | A |   | 5/1972 | Bowen et al. |
|---|---|---|---|---|
| 4,191,270 | A |   | 3/1980 | Monteith |
| 4,409,832 | A |   | 10/1983 | Konjedic et al. |
| 5,159,855 | A |   | 11/1992 | Nikolaus et al. |
| 5,177,964 | A | * | 1/1993 | Tanaka et al. ............. 60/445 |
| 5,343,779 | A |   | 9/1994 | Nikolaus et al. |
| 5,488,787 | A | * | 2/1996 | Aoyagi et al. ............. 37/348 |
| 5,564,519 | A |   | 10/1996 | Katoh et al. |
| 5,754,970 | A | * | 5/1998 | Takasaki et al. ............. 701/87 |

(Continued)

FOREIGN PATENT DOCUMENTS

EP        0 589 507 A2    9/1993

(Continued)

OTHER PUBLICATIONS

U.S. Appl. No. 10/466,471, filed Jul. 16, 2003, Ichimura.

(Continued)

*Primary Examiner*—Brian Sircus
*Assistant Examiner*—Danny Nguyen
(74) *Attorney, Agent, or Firm*—Oliff & Berridge, PLC

(57) ABSTRACT

A failure detection device for a hydraulic motor according to the present invention comprises a hydraulic pump 3 that is driven by a prime mover 2; a hydraulic motor 1 for traveling that is driven by hydraulic oil discharged from the hydraulic pump 3; a transmission 7 that is connected with an output shaft of the hydraulic motor 1 for traveling; a stopping detection device 26 that detects that a traveling vehicle has stopped; a fluid level detection device 35 that detects an oil level in the transmission 7; and a warning device 39, 40 that issues a warning when the stopping detection device 26 detects that the traveling vehicle has stopped, and also the fluid level detection device 35 detects that the oil level in the transmission 7 has reached a predetermined value La.

19 Claims, 10 Drawing Sheets

U.S. PATENT DOCUMENTS

| | | | |
|---|---|---|---|
| 5,769,753 A * | 6/1998 | Kusafuka et al. | 477/116 |
| 5,842,144 A | 11/1998 | Coutant et al. | |
| 5,845,494 A | 12/1998 | Nishizawa et al. | |
| 5,890,982 A | 4/1999 | Meyerle | |
| 6,067,795 A | 5/2000 | Iino et al. | |
| 6,224,168 B1 * | 5/2001 | Yamada | 303/3 |
| 6,250,077 B1 * | 6/2001 | Iino et al. | 60/436 |
| 6,577,959 B1 * | 6/2003 | Chajec et al. | 702/50 |
| 2004/0060206 A1 | 4/2004 | Ichimura | |
| 2004/0168435 A1 * | 9/2004 | Ichimura et al. | 60/403 |

FOREIGN PATENT DOCUMENTS

| | | |
|---|---|---|
| GB | 1 600 699 | 10/1981 |
| JP | 49-61775 | 6/1974 |
| JP | 50-16231 | 2/1975 |
| JP | 50-31378 | 4/1975 |
| JP | U 58-116853 | 8/1983 |
| JP | A-10-121963 | 5/1988 |
| JP | A 63-150440 | 6/1988 |
| JP | A 4-238740 | 8/1992 |
| JP | A-4-258570 | 9/1992 |
| JP | U 5-96623 | 12/1993 |
| JP | A-6-134833 | 5/1994 |
| JP | U-6-37608 | 5/1994 |
| JP | A-6-183282 | 7/1994 |
| JP | A 6-207608 | 7/1994 |
| JP | A 8-282978 | 10/1996 |
| JP | A-9-193108 | 7/1997 |
| JP | A-9-216792 | 8/1997 |
| JP | A-9-250510 | 9/1997 |
| JP | A-2000-96604 | 4/2000 |
| JP | A-2000-170908 | 6/2000 |
| JP | A 2000-234535 | 8/2000 |
| WO | WO 93/13340 | 7/1993 |

OTHER PUBLICATIONS

U.S. Appl. No. 10/450,945, filed Jun. 18, 2003, Ichimura et al.

* cited by examiner

FAILURE DETECTION DEVICE FOR HYDRAULIC MOTOR AND HYDRAULIC DRIVE VEHICLE

TECHNICAL FIELD

This invention relates to a device that detects a failure of the hydraulic motor installed in the hydraulic drive vehicle such as a wheeled hydraulic excavator.

BACKGROUND ART

Generally, the hydraulic drive vehicle such as a wheeled hydraulic excavator comprises a hydraulic pump and a hydraulic motor for travelling which is driven by oil discharged from the hydraulic pump. The output shaft of this hydraulic motor is connected with the input shaft of the transmission, and the rotation of the hydraulic motor is transmitted to the wheels through the transmission. A drain chamber is provided to the hydraulic motor, and the drain oil from the hydraulic motor returns to a reservoir via the drain chamber. A seal member is provided between the drain chamber of the motor and a transmission chamber of the transmission, in order to prevent the drain oil from flowing into the transmission chamber from the drain chamber.

In such a hydraulic drive vehicle as described above, if a foreign body should be ingested by the hydraulic motor, proper operation of the hydraulic motor is impeded and there is a danger that the hydraulic motor may be damaged. If the hydraulic motor is damaged, a copious flow of the discharged oil from the hydraulic pump flows into the drain chamber and then flows into the transmission chamber, penetrating through the seal member. As a result, the transmission chamber is filled with the drain oil, and a great resistance comes to act on the transmission so that the travelling performance of the vehicle deteriorates. Moreover, when transmission oil becomes mixed with the drain oil, the quality of the mission oil may be deteriorated, and this may exert a negative influence upon the operation of the transmission.

DISCLOSURE OF THE INVENTION

The present invention is to provide a failure detection device for a hydraulic motor that is capable of detecting abnormal operation of the hydraulic motor to respond appropriately an abnormal operational situation.

Moreover, the present invention is to provide a hydraulic drive vehicle which is equipped with such a failure detection device for a hydraulic motor.

In order to achieve the object described above, a failure detection device for a hydraulic motor according to the present invention comprises a hydraulic pump that is driven by a prime mover; a hydraulic motor for traveling that is driven by hydraulic oil discharged from the hydraulic pump; a transmission that is connected with an output shaft of the hydraulic motor for traveling; a stopping detection device that detects that a traveling vehicle has stopped; a fluid level detection device that detects an oil level in the transmission; and a warning device that issues a warning when the stopping detection device detects that the traveling vehicle has stopped, and also the fluid level detection device detects that the oil level in the transmission has reached a predetermined value.

Furthermore, a hydraulic drive vehicle according to the present invention comprises a hydraulic pump that is driven by a prime mover; a hydraulic motor for traveling that is driven by hydraulic oil discharged from the hydraulic pump; a transmission that is connected with an output shaft of the hydraulic motor for traveling; a stopping detection device that detects that the vehicle has stopped; a fluid level detection device that detects an oil level in the transmission; and a warning device that issues a warning when the stopping detection device detects that the vehicle has stopped, and also the fluid level detection device detects that the oil level in the transmission has reached a predetermined value.

Therefore, it is possible for an operator to recognize an abnormal state of the hydraulic motor at an early stage and to take an appropriate countermeasure to the abnormal state.

It is also acceptable to restrict a driving of the hydraulic motor for traveling instead of issuing a warning. It is desirable to lower the rotational speed of the prime mover when the abnormal state of the traveling motor has been detected. It is also acceptable to prevent the vehicle from traveling upon detection of the abnormal state. In such an abnormal state, restart of the prime mover may be prevented. In addition, a warning may be issued as well.

It is also possible to disable the warning device from issuing the warning or to disable a drive restriction upon the vehicle, when the working state has been detected.

It is desirable to cancel the above-described control in response to a reset command. An ignition key switch may issue such a reset command.

BEST MODE FOR CARRYING OUT THE INVENTION

First Embodiment

A wheeled hydraulic excavator that is equipped with a failure detection device according to the first embodiment of the present invention will now be described with reference to FIGS. 1 through 4. The wheeled hydraulic excavator comprises a wheeled undercarriage upon which an upper-structure is rotatably mounted, and a working attachment is fitted to this upper-structure. A hydraulic motor 1 for traveling which is driven by a hydraulic circuit for traveling shown in FIG. 1 is provided in the undercarriage.

Figure 1:
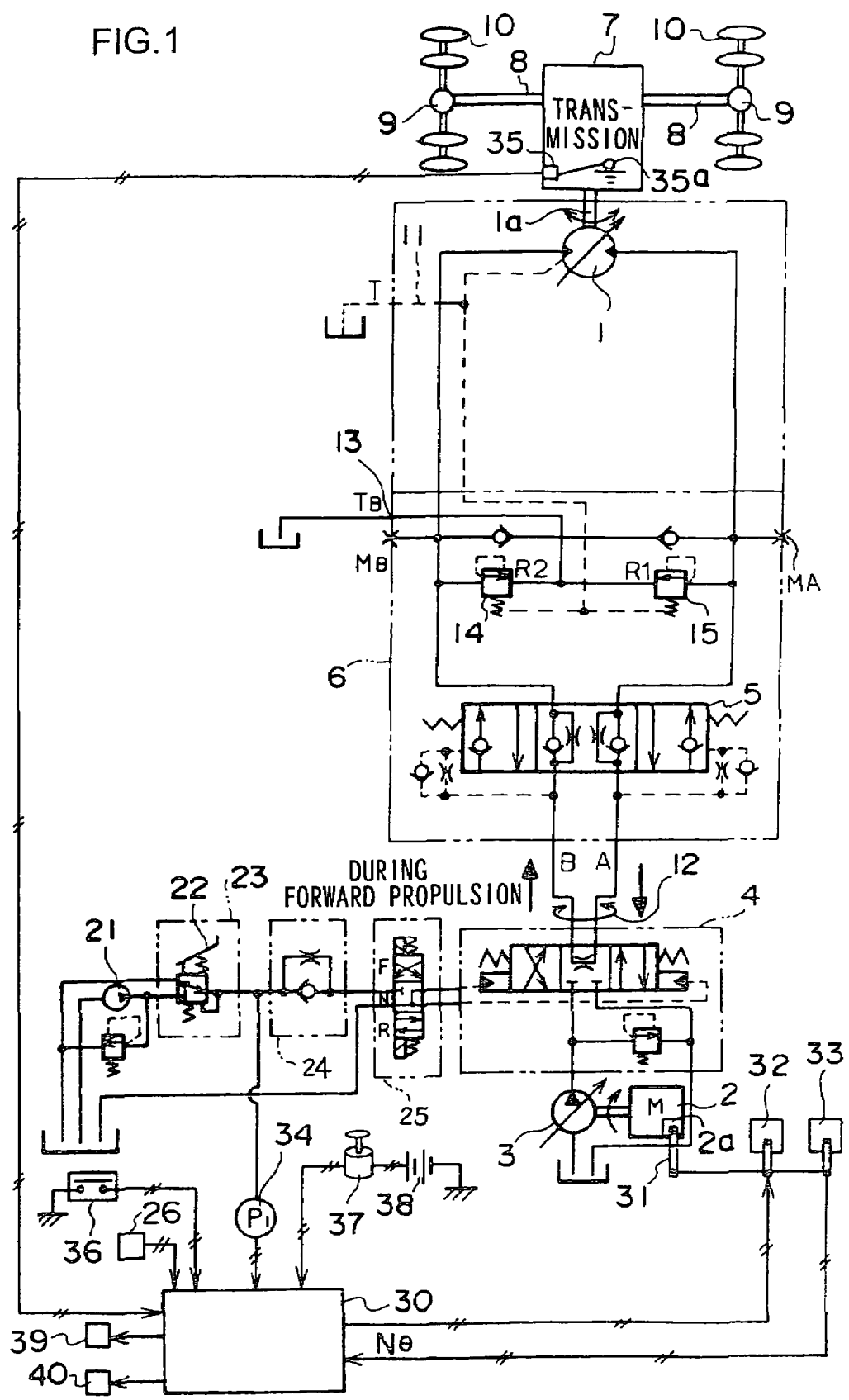
FIG. 1 is a circuit diagram showing the structure of the wheeled hydraulic excavator equipped with the failure detection device for a hydraulic motor according to the first embodiment of the present invention.

As shown in FIG. 1, hydraulic oil is discharged from a main pump 3 which is driven by an engine, the direction and flow rate of the discharged oil are controlled by a control valve 4, and then the hydraulic oil is supplied to a traveling motor 1 via a brake valve 6 with a built-in counterbalance valve 5. A transmission 7 is connected with an output shaft la of the traveling motor 1. The rotational speed of the traveling motor 1 is changed by the transmission 7, and is transmitted to tires 10 through propeller shafts 8 and axles 9. Thus, the wheeled hydraulic excavator is propelled. It should be noted that the pressure oil from the main pump 3 is also supplied to a hydraulic circuit for working which is not shown in the figure, and drives actuators for working.

The direction of changeover and operation amount of the control valve 4 are controlled by pilot pressure from a pilot control circuit. The traveling speed of the vehicle can be controlled by controlling the amount by which the control valve 4 is operated. The pilot control circuit comprises a pilot pump 21, a traveling pilot valve 23 that generates a secondary pilot pressure P1 according to the amount by which an accelerator pedal 22 is stepped upon, a slow-return valve 24 that delays oil returning to the pilot valve 23, and a forward/reverse switchover valve 25 which is used for selecting forward traveling, reverse traveling or neutral for the vehicle. The forward/reverse switchover valve 25 is constituted of a solenoid-controlled directional control valve, and its position is changed over by operating a switch not shown in the figures.

FIG. 1 shows the condition with the forward/reverse switchover valve 25 in its neutral (N) position, and moreover when the traveling pilot valve 23 is not being operated. Accordingly, the control valve 4 is in its neutral position, the pressure oil from the main pump 3 returns to a reservoir, and the vehicle remains stopped. When the forward/reverse switchover valve 25 is switched to its forward traveling position (F position) or to its reverse traveling position (R position) by the operation of the switch, and then the accelerator pedal 22 is stepped upon, the secondary pressure P1 according to the amount by which the accelerator pedal is operated acts on a pilot port of the control valve 4. The control valve 4 is operated by the operation amount corresponding to the secondary pilot pressure P1. Thus, the discharged oil from the main pump 3 is led to the traveling motor 1 via the control valve 4, a center joint 12 and the brake valve 6, so as to drive the traveling motor 1. At this time, the leakage oil from the traveling motor 1 is collected to the reservoir through a drain line (drain chamber) 11.

When the accelerator pedal 22 is released during the vehicle traveling, the pressure oil from the pilot pump 21 is interrupted by the traveling pilot valve 23, and its outlet port is connected to the reservoir. As a result, the pressure oil having acted on the pilot port of control valve 4 returns to the reservoir via the forward/backward switchover valve 25, the slow-return valve 24 and the traveling pilot valve 23. At this time, the returning oil flow is restricted by the restriction of the slow return valve 24, so that the control valve 4 returns to its neutral position gradually. When the control valve 4 returns to its neutral position, the supply of the pressure oil (drive pressure) is interrupted, and the counterbalance valve 5 is then switched to its neutral position as shown in FIG. 1.

At this time, the vehicle continues to progress due to its inertia force, and the operation of the traveling motor 1 changes over from motor action to pump action, in which its B port is its suction (inlet) port and its A port is its discharge (outlet) port in FIG. 1. Flow of the pressure oil from the traveling motor 1 is restricted by the restriction of the counterbalance valve 5 (neutral restriction), the pressure between the counterbalance valve 5 and the traveling motor 1 then rises and acts on the traveling motor 1 as brake pressure. As a result, the traveling motor 1 generates the brake torque to slow the vehicle down. If, during the pump operation, the quantity of oil flowing into the traveling motor 1 becomes insufficient, the additional oil is supplied from a make-up port 13 thereto. The maximum brake pressure is regulated by relief valves 14 and 15.

A governor 2a of the engine 2 is connected with a pulse motor 32 via a link mechanism 31, and the rotational speed of engine 2 is controlled by rotation of the pulse motor 32. In particular, the engine speed is increased by the normal rotation of the pulse motor 32, while it is decreased by the reverse rotation of the pulse motor. A potentiometer 33 is connected with the governor 2a via the link mechanism 31, and this potentiometer 33 detects a governor lever angle corresponding to the rotational speed of the engine 2. The detected value is input to the controller 30 as a control rotational speed NO.

Furthermore, the controller 30 is connected with a speed sensor 26 that detects the vehicle speed, a pressure sensor 34 that detects the secondary pilot pressure P1 generated by the traveling pilot valve 23 corresponding to the pedal operation amount, a fluid level sensor 35 that detects the oil level in the transmission 7, a reset switch 36, and an ignition key switch 37 that is turned on/off according to the operation of an ignition key, respectively. The fluid level sensor 35 is a limit switch, the limit switch 35 is turned on by a float 35a when the oil level in the transmission reaches a predetermined value La which is set in advance.

A power source 38 is connected with the key switch 37, and the electrical power is supplied to the controller 30 in response to the key switch 37 being turned on. Accordingly, the controller 30 implements calculations as will be described later, to control the rotation of the pulse motor 32 by outputting the control signal to the pulse motor 32 and also to control operations of a buzzer 39 and a warning lamp 40 (which together are referred to as a warning device) by outputting control signals thereto.

Figure 2:
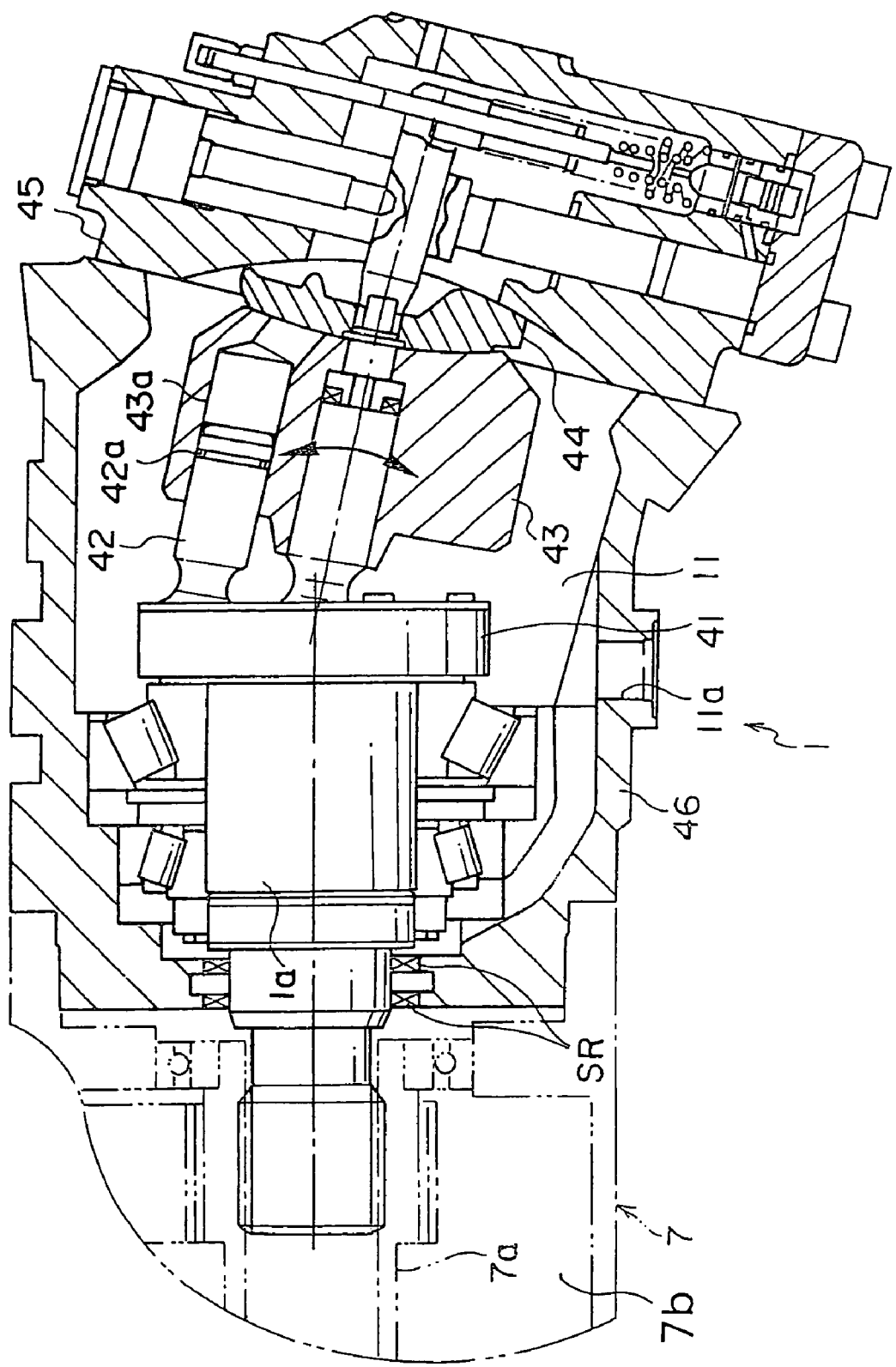
FIG. 2 is sectional view of a traveling motor to which the present invention has been applied.

Next, the construction of the traveling motor 1 will be explained. FIG. 2 is a sectional view of the variable displacement traveling motor 1. As shown in FIG. 2, a plurality of pistons 42 (only one of which is shown in the figure) are connected with a flange 41 of the output shaft la of the traveling motor 1, along its circumferential direction. The pistons 42 are slidably inserted into oil chambers 43a formed in a cylinder block 43 through piston rings 42a. The end of the cylinder block 43 comes into contact with a swash plate 44, and their contacting surfaces mutually define a circular cone shape. The swash plate 44 can be swung or inclined together with the cylinder block 43 in the direction of the arrow shown in the figure, and the motor displacement varies according to the swing amount or inclined angle of the swash plate.

An inlet or suction port and an outlet or delivery port of oil, not shown in the figure, are provided in the swash plate and a motor cover 45 which is in contact with the swash plate 44, the suction port and the delivery port extending over half a phase, respectively. And, the pressure oil from main pump 3 flows into the oil chambers 43a through the suction port, while the oil from the oil chambers 43a flows out to the reservoir through the delivery port. Due to this, the pistons 42 are slid within the oil chambers 43a, and, while the swash plate 44 is kept in contact with the cylinder block 43, the output shaft 1a of the motor 1 rotates as a unit with the cylinder block 43 and the pistons 42. An input shaft 7a of the transmission 7 is connected by splines with the motor output shaft 1a so that the rotation of the traveling motor 1 is transmitted to the transmission 7.

At this time, portions of the pressure oil which is supplied to the oil chambers 43a from the main pump 3 leaks into the drain chamber 11 through gaps between the mutually contacting surfaces of the swash plate 44 and the cylinder block 43, or gaps between the mutually sliding surfaces of the pistons 42 and the oil chambers 43a. This leakage oil returns to the reservoir via a drain hole 1a which is provided in the bottom of the motor casing 46, while the oil is prevented from flowing into the transmission chamber 7b from the drain chamber 11 by seal rings SR.

If, at this time, a foreign body, for example, should get into the mutually sliding surfaces of one of the pistons 42 and causes the piston 42 to stick in (to contact directly with) the cylinder block 43, the cylinder block 43 rotates while being dragged by the piston 42 and then, the gap between the cylinder block 43 and the swash plate 44 becomes partially increased. Moreover, according to circumstances, the piston ring 42a may be damaged, which causes the gap between the mutually sliding surfaces to become wider. As a result, a large quantity of the pressure oil from the main pump 3 flows into the drain chamber 11 through these gaps, and the oil in the drain chamber 11 may penetrate through the seal rings SR to flow into the transmission chamber 7b. If this happens, the oil level in the transmission chamber 7b rises, and the resistance that acts on the driving shaft of the transmission 7 may increase, as well as the performance of the transmission oil may deteriorate, which exerts a negative effect on the operation of the transmission 7.

In this embodiment, this type of abnormal operation of the traveling motor 1 is detected with a vehicle speed sensor 26 and a fluid level sensor 35, and such abnormal state is responded as follows.

Figure 3:
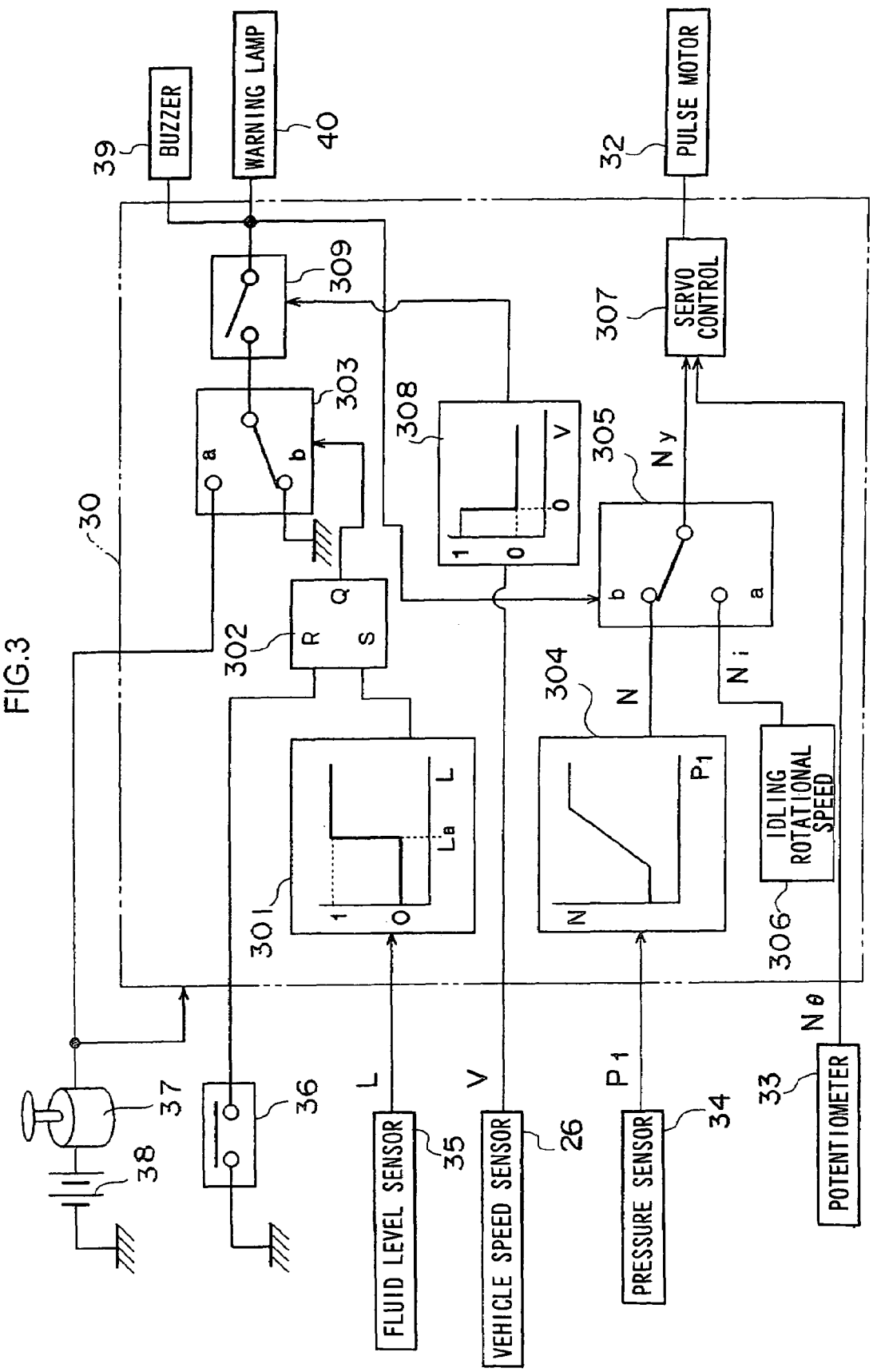
FIG. 3 schematically illustrates the details of a controller which constitutes the failure detection device according to the first embodiment of the present invention.

FIG. 3 is a schematic illustration to explain details of the controller 30. When the ignition key switch 37 is turned on, the electric power is supplied to the controller 30 to start execution of its processing. A function generator 301 outputs a set signal to a set terminal S of a RS flip-flop 302 when the fluid level sensor 35 is switched on, that is, when the oil level in the transmission chamber 7b is equal to or greater than the predetermined value La. The value La, in this case, is set to correspond to rise of the oil level due to the breakdown of the motor 1, as described above, so that when the oil level reaches the value La, it may be determined that the traveling motor 1 has broken down.

When the set signal is input to the set terminal S of the flip-flop 302, the flip-flop 302 outputs a high-level signal from its terminal Q to change over a switchover circuit 303 to its contact "a" side. When the vehicle speed detected by the speed sensor 26 is equal to or lower than a predetermined value (which may equal zero), in other words, when the vehicle has stopped, a function generator 308 outputs a close signal to close a changeover switch 309. As a result, electrical power is supplied to a buzzer 39 and a warning lamp 40, so that the buzzer emits sound and the warning lamp 40 is illuminated.

When a reset switch 36 is turned on, the reset switch 36 outputs are set signal to a reset terminal R of the flip-flop 302. The flip-flop 302 sets low-level in the terminal Q in response to this reset signal, and the switchover circuit 303 is then switched to its contact "b" side. As a result, the supply of electrical power to the buzzer 39 and the warning lamp 40 is interrupted so that the buzzer sound is brought to a halt and the warning lamp 40 is extinguished. And, when it is detected by the speed sensor 26 that the vehicle is traveling, an open signal is output to the changeover switch 309 to open the changeover switch 309. Also in this case, the buzzer sound is stopped, and the warning lamp 40 is turned off.

A function by which the engine speed should increase along with increase of the traveling pilot pressure is set in advance in the function generator 304, as schematically shown in the figure. The function generator 304 sets the rotational speed N corresponding to the detected value P1 from the pressure sensor 34 based upon this function, and outputs this set value N to a switchover circuit 305. When the switchover circuit 303 is switched to its contact "a" side and also the changeover switch 309 is closed, the switchover circuit 305 is switched to its contact "a" side. On the other hand, when the switchover circuit 303 is switched to its contact "b" side and also the changeover switch 309 is open, the switchover circuit 305 is switched to its contact "b" side. Accordingly, the switchover circuit 305 selects either the rotational speed N as set by the function generator 304 or an idling rotational speed Ni which is set in advance in a rotational speed setting device 306, and outputs its selected rotational speed to a servo control section 307 as a target rotational speed Ny. In the servo control section 307, the target rotational speed Ny is compared with the control rotational speed Nθ which corresponds to the amount of displacement of the governor lever as detected by the potentiometer 33, and the pulse motor 32 is controlled so as to bring the control rotational speed Nθ to match the target rotational speed Ny, according to the procedure shown in FIG. 4.

Figure 4:
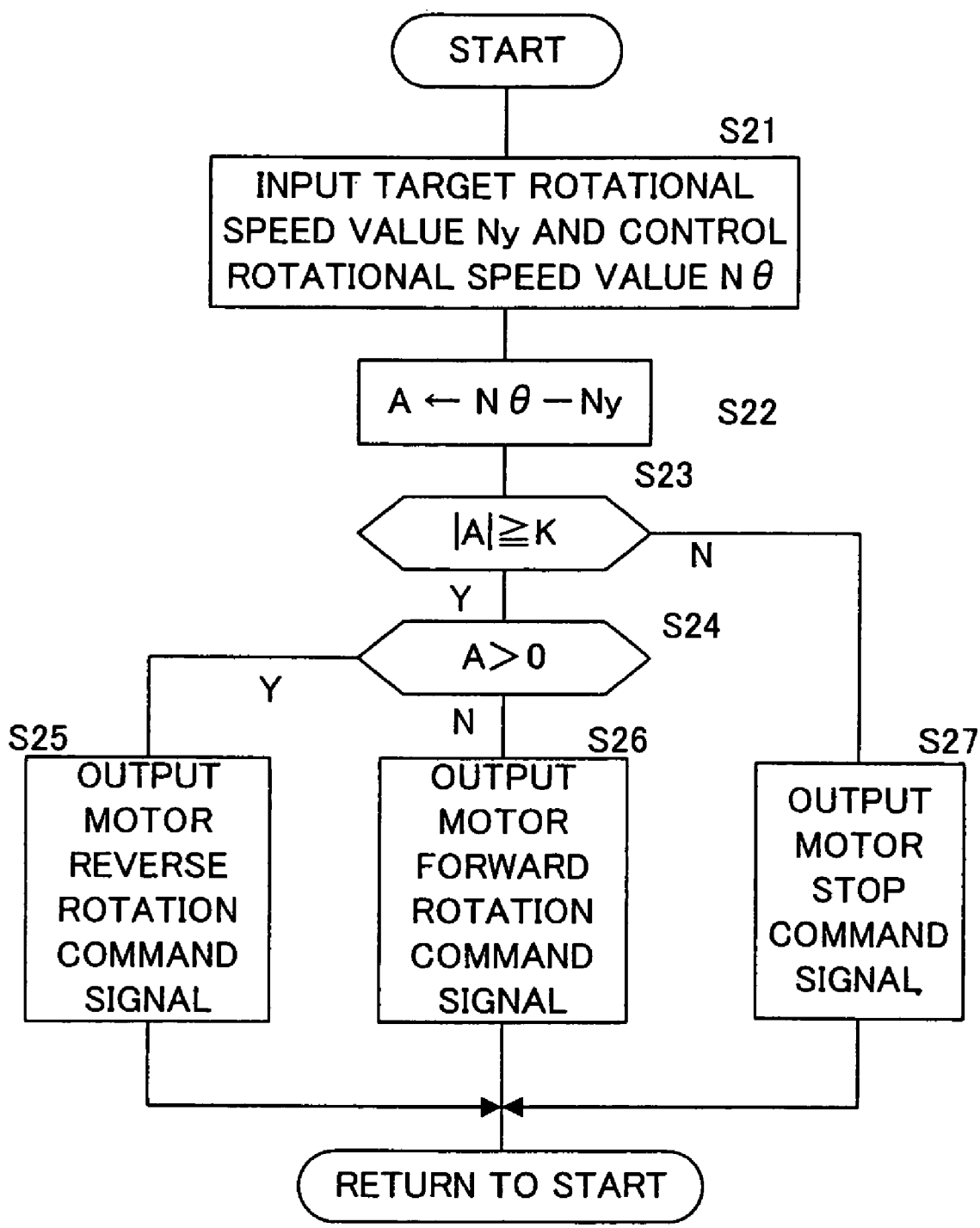
FIG. 4 is a flow chart showing an example of procedure executed by the controller.

Referring to FIG. 4, first in step S21, the rotational speed command value Ny and the control rotational speed Nθ are read in, and then the flow of control proceeds to step S22. In step S22, Ny is subtracted from Nθ and the result of this subtraction, i.e. the rotational speed differential A, is stored in a memory. In step S23, using a predetermined standard rotational speed differential K set in advance, it makes a decision as to whether or not $|A| \geq K$. If an affirmative decision is made, the flow of control proceeds to step S24 in which a decision is made as to whether or not the rotational speed differential A>0. If A>0, it implies that the control rotational speed Nθ is greater than the rotational speed command value Ny, in other words, the control rotational speed is higher than the target rotational speed, the flow of control then proceeds to step S25 in which a signal for instructing reverse rotation of the motor is output to the pulse motor 32 in order to reduce the engine speed. As a result, the pulse motor 32 is caused to rotate in reverse so that the rotational speed of the engine 2 drops.

On the other hand, if $A \leq 0$, it implies that the control rotational speed Nθ is lower than the rotational speed command value Ny, that is, the control rotational speed is lower than the target rotational value, a signal for instructing normal rotation of the motor is output in order to increase the engine speed, in step S26. As a result, the pulse motor 32 performs normal rotation to increase the engine speed. If a negative decision is made in step S23, the flow of control proceeds to step S27 to output a motor stop signal. Therefore, the rotational speed of the engine 2 is maintained constant. After the appropriate one of the steps S25–S27 has been executed, the flow of control returns to the beginning of this flow chart.

The outstanding features of the operation of this failure detection device for a hydraulic drive vehicle constructed as described above will now be explained in concrete term.

(1) During Normal Operation of the Traveling Motor

When the traveling motor 1 is in the normal operating condition, there is substantially no oil flow from the drain chamber to the transmission chamber 7b, and the oil level in the transmission chamber 7b remains equal to or less than the predefined value La while vehicle is stopped. Therefore, the switchover circuit 303 and the switchover circuit 305 of the controller 30 are switched to their contact "b" side, respectively. In this condition, if the forward/backward switchover valve 25 is switched to forward traveling or to reverse traveling, and also the accelerator pedal 22 is stepped upon, the traveling pilot pressure P1 is generated in correspondence to the amount by which the accelerator pedal is operated. The servo control section 307 compares the target rotational speed Ny according to this traveling pilot pressure P1 with the control rotational speed Nθ corresponding to the detected value from the potentiometer 33, and then controls the pulse motor 32 to bring both rotational speeds to correspond to each other. Therefore, the vehicle is propelled with its engine speed increasing in line with the increase of the amount of pedal operation.

While the vehicle travels, if the oil in the transmission chamber 7b is churned up by the rotation of the drive shaft of the transmission 7, the fluid level sensor 35 may be switched on due to change of the oil level. Although the switchover circuit 303 is switched to its contact "a" side in response to operation of the fluid level sensor, the warning devices 39 and 40 will not operate because the changeover switch 309 is open.

(2) When Operation of the Traveling Motor Becomes Abnormal

If the motor piston 42 should get stuck at its sliding portion, by a foreign body having gotten into the sliding portion, a large quantity of delivery oil from the hydraulic pump 3 may flow into the drain chamber 11 as described above. And, if some of this drain oil should flow into the transmission chamber 7b penetrating past or through the seal rings SR and the oil level in the transmission chamber 7b should reach the predefined value La, the function generator 301 outputs the set signal to the set terminal of the flip-flop 302 so that the switchover circuit 303 is switched to its contact "a" side in response to a high level signal output from the Q terminal of the flip-flop 302. When the vehicle stops under this condition, the changeover switch 309 is closed so that warning lamp 40 is illuminated, as well as the buzzer sound being emitted. Accordingly, the operator becomes aware of an abnormal state of the traveling motor 1, and is able to perform an appropriate operation, e.g. to stop the engine, in response to such abnormal state of the motor 1.

At this time, the switchover circuit 305 is switched to the contact "a" side. Due to this, the engine speed is lowered to its idling rotational speed Ni, and the motor rotational speed also drops in line with reduction in amount of the delivery oil from the pump. As a result, the quantity of oil flow into the drain chamber 11 decreases, so that it becomes possible to minimize the leakage of oil from the drain chamber 11 to the transmission chamber 7b. Moreover, useless consumption of fuel can be prevented. It should be understood that the oil collected in the transmission chamber 7b can be exhausted through a drain hole not shown in the figures, and thereby it is possible to regulate the oil level in the transmission chamber 7b within the predetermined value.

In the state in which the oil level in the transmission chamber 7b is below the predetermined value La, when the reset switch 36 is operated, the terminal Q of the flip-flop 302 is set to low level and then the switchover circuits 303 and 305 are switched to their contacts "b" side, respectively. Due to this, the buzzer sound is stopped and also the warning lamp 40 is extinguished. Moreover, it becomes again possible to control the engine speed in accordance with operation of the accelerator pedal. As a result, when the vehicle is to be transported upon a trailer for the repair of the traveling motor 1, it is possible to load the vehicle onto the trailer by driving it under its own power. It should be understood that, instead of operating the reset switch 36, it would also be acceptable to turn off the ignition key switch 37. If the traveling motor 1 is damaged heavily and driving the vehicle under its own power is difficult or impossible, it may be pulled up on the trailer by engaging the end of a bucket of the hydraulic excavator with part of the trailer and then actuating hydraulic cylinders for a boom or arm.

According to the first embodiment as described above, a failure of the traveling motor 1 is detected when the oil level in the transmission chamber 7b has reached the predetermined value La while the vehicle stops, and then the warning devices 39 and 40 are caused to operate. Therefore, it is possible for an operator to be made aware of abnormal operation of the traveling motor 1 at an early stage, and to respond appropriately to such abnormal circumstances. In this case, if a period of time is required before the oil level becomes steady, it may be possible to detect a failure of the traveling motor 1 based on the value detected by the fluid level sensor 35 after such a period of time.

Moreover, the engine speed is lowered to the idling rotation speed Ni to restrict the drive of the traveling motor 1 when a breakdown of the motor 1 is detected. Therefore, the quantity of oil flow into the drain chamber 11 is reduced irrespective of operation amount of the accelerator pedal 22, and it is possible to prevent oil leakage into the transmission chamber 7b. In addition, the warning devices 39 and 40 continue to be operated and the restriction upon traveling of the vehicle is maintained until the reset switch 36 is actuated or the ignition key switch 37 is turned off when the oil level in the transmission chamber 7b has dropped to the predefined value La or lower. Therefore, it is possible that an operator is reliably made aware of the abnormal operation in the traveling motor 1. In addition, when the restriction upon the traveling of the vehicle has been cancelled, the engine speed can again be increased according to the operation of the accelerator pedal and it is possible to load the vehicle upon the trailer or the like easily.

Second Embodiment

Figure 5:
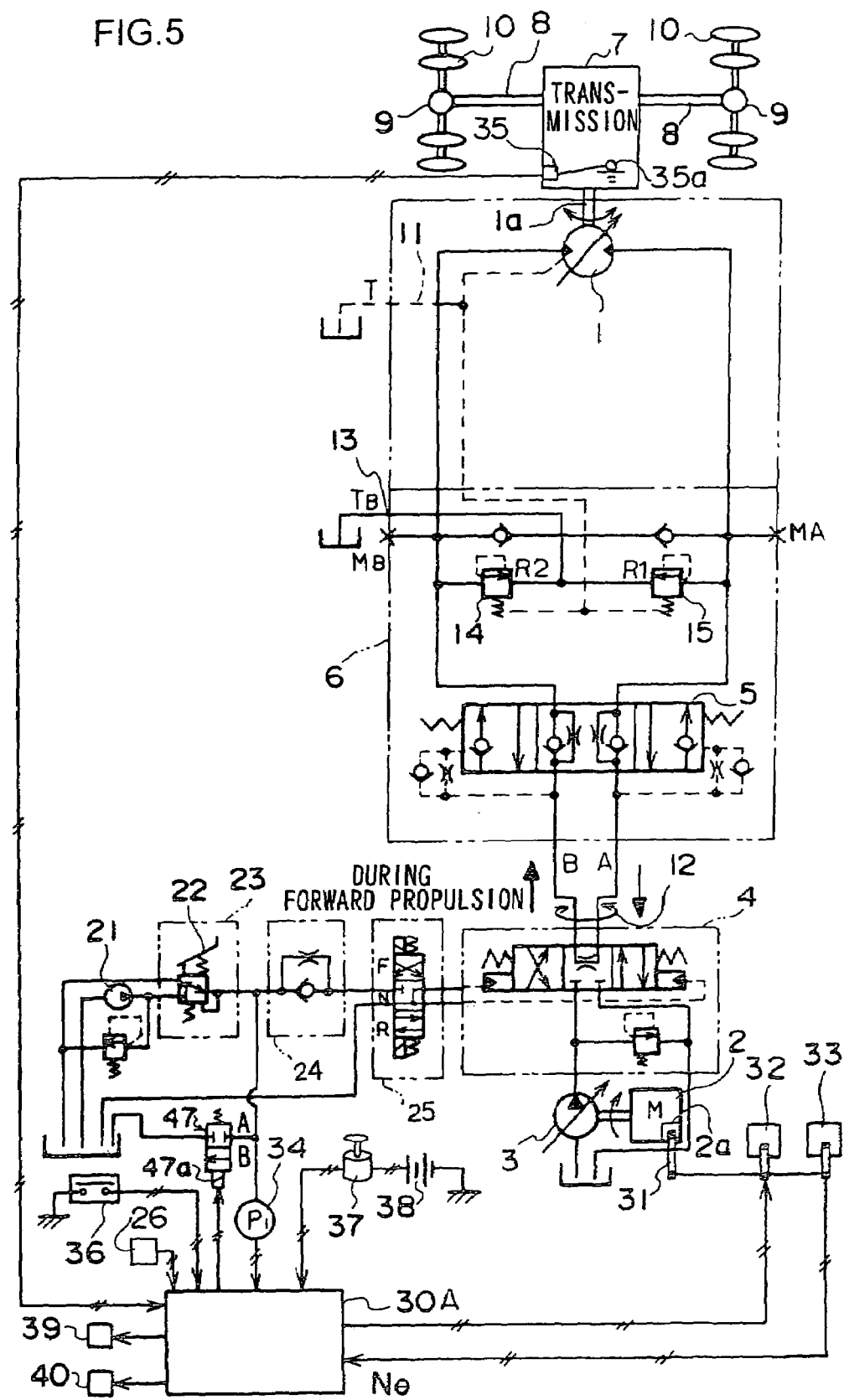
FIG. 5 is a circuit diagram showing the structure of the wheeled hydraulic excavator equipped with the failure detection device for the hydraulic motor according to the second embodiment of the present invention.
Figure 6:
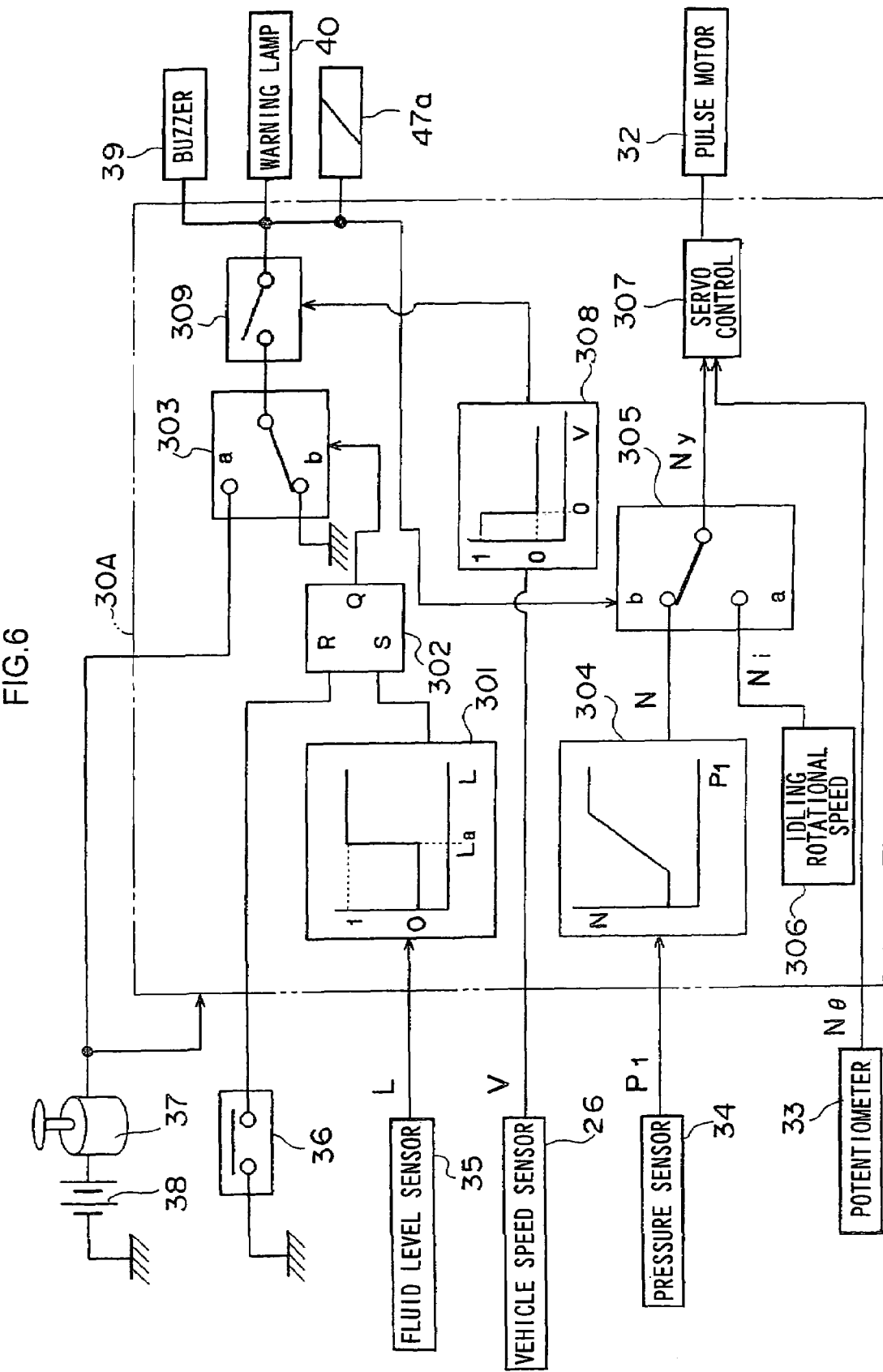
FIG. 6 schematically illustrates the details of a controller which constitutes the failure detection device according to the second embodiment of the present invention.

While, in the first embodiment, the engine speed is lowered to the idling rotational speed Ni to restrict the vehicle speed during a failure in the traveling motor 1, the vehicle will be prohibited from traveling, in the second embodiment. The second embodiment of the present invention will now be explained with reference to FIGS. 5 and 6. FIG. 5 is a circuit diagram showing the structure of a wheeled hydraulic excavator which is equipped with a failure detection device according to the second embodiment, and FIG. 6 schematically illustrates details of a controller 30A according to the second embodiment. It should be noted that the same reference numerals are used for elements similar to that of FIGS. 1 and 3, and the explanation will focus on the points different therefrom.

As shown in FIG. 5, the line between the traveling pilot valve 23 and the slow-return valve 24 can be connected with the reservoir through a solenoid valve 47. The solenoid valve 47 is controlled by a control signal from the controller 30A. As shown in FIG. 6, a solenoid 47a of the solenoid valve 47 is connected with the changeover switch 309.

While the vehicle is stationary, in other words, while the changeover switch 309 is closed, if the switchover circuit 303 is switched to the contact "a" side due to a failure of the traveling motor 1, the solenoid 47a is excited to switch the solenoid valve 47 to its position B. As a result, the pressure oil having acted on the pilot port of control valve 4 returns to the reservoir via the forward/backward switchover valve 25, the slow return valve 24 and the solenoid valve 47, and the control valve 4 is driven back to its neutral position. As a result, the supply of pressure oil to the traveling motor 1 is intercepted, and even if the accelerator pedal 22 is actuated, the vehicle stationary state is maintained. In addition, the warning devices 39 and 40 operate, and the engine speed is limited to the idling rotational speed Ni.

If, in such condition, the reset switch 36 is actuated, the switchover circuit 303 and 305 are switched to the contact "b" side, respectively. Accordingly, the solenoid 47a is demagnetized, and the solenoid valve 47 is switched to its position A. As a result, the traveling pilot pressure corresponding to the operation of the accelerator pedal is made to act on the pilot port of the control valve 4, and the supply of the pressure oil to the traveling motor 1 becomes possible.

According to the second embodiment as described above, when a failure in the traveling motor 1 is detected, the traveling pilot pressure is made to return to the reservoir by the operation of the solenoid valve 47. Therefore, even if the accelerator pedal 22 is actuated, the traveling motor 1 continues to be prevented from rotating, and thereafter it is possible to prevent further oil leakage into the drain chamber 11.

It should be noted that it would also be acceptable to additionally operate a brake, such as a parking brake. In this manner, it would be possible to ensure the stationary state of the vehicle. Moreover, it would also be acceptable to control the engine speed according to the value corresponding to the traveling pilot pressure, instead of limiting the engine speed to the idling rotational speed Ni. In this case, the switchover circuit 305 would become unnecessary.

Third Embodiment

Figure 7:
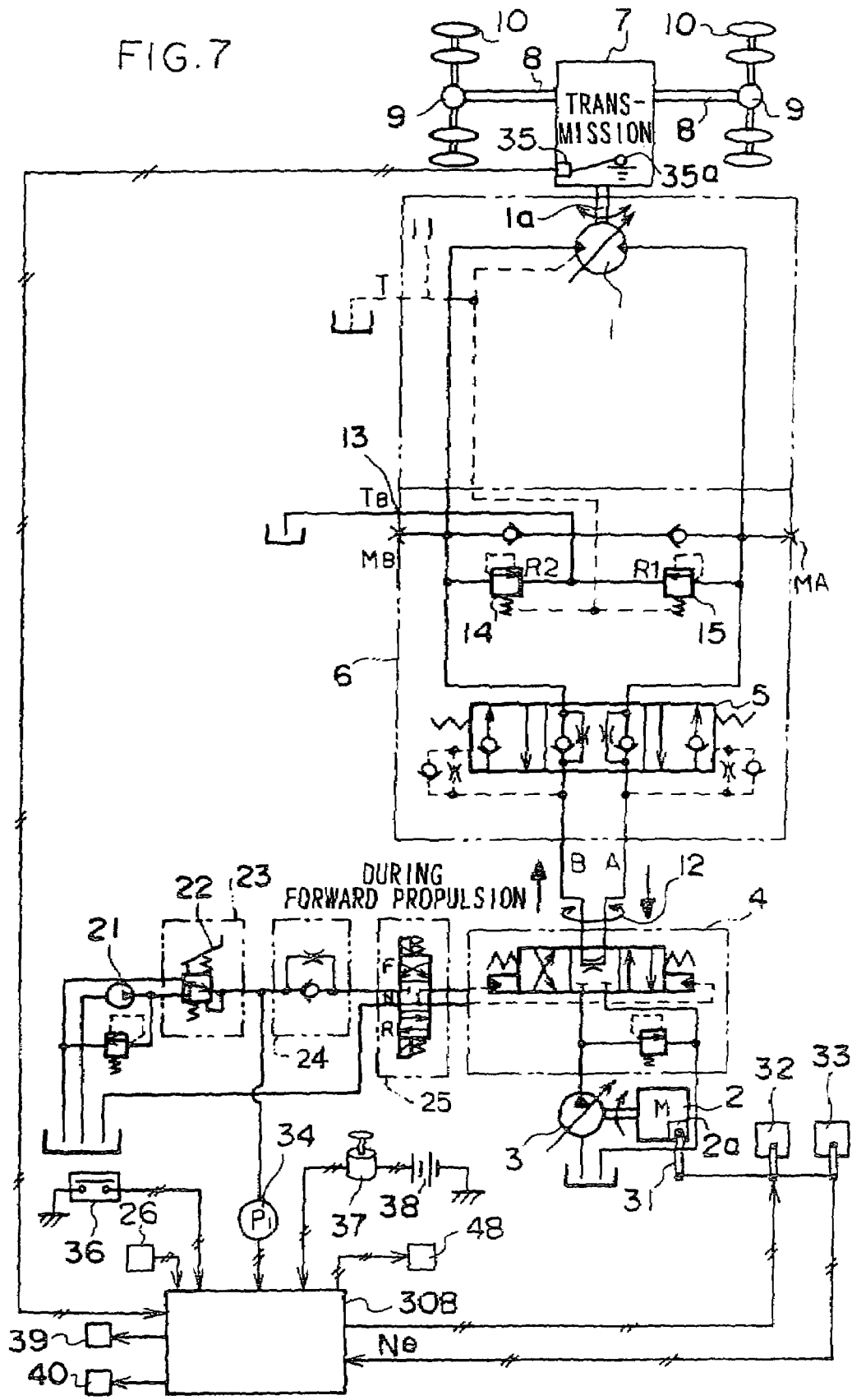
FIG. 7 is a circuit diagram showing the structure of the wheeled hydraulic excavator equipped with the failure detection device for a hydraulic motor according to the third embodiment of the present invention.
Figure 8:
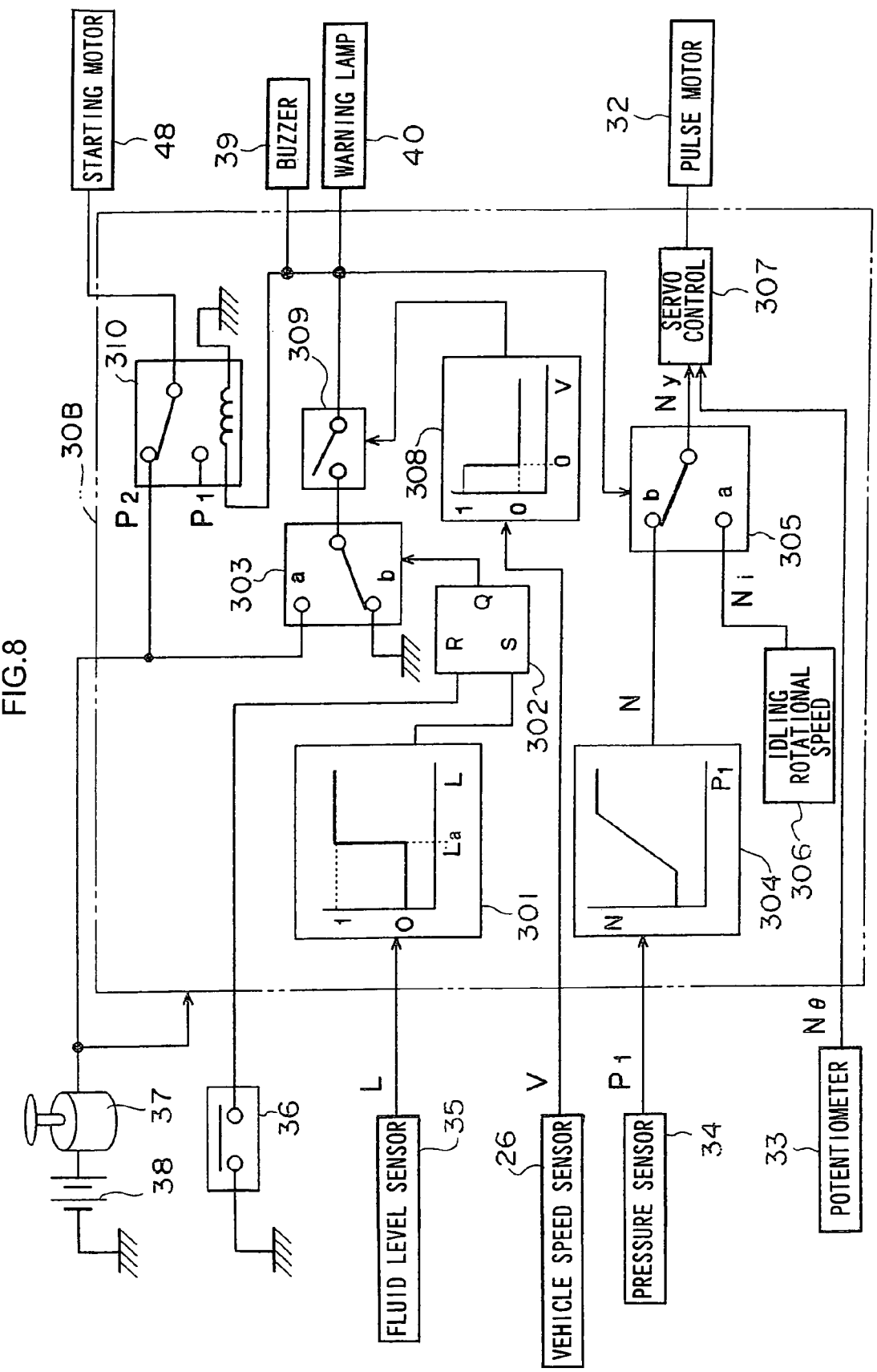
FIG. 8 schematically illustrates the details of the controller which constitutes the failure detection device according to the third embodiment of the present invention.

While, in the first embodiment, the engine speed is lowered to the idling rotational speed Ni to restrict the vehicle speed during a failure in the traveling motor 1, in addition to this function, the engine 2 is prohibited from restarting, in the third embodiment. The third embodiment of the present invention will now be explained with reference to FIGS. 7 and 8. FIG. 7 is a circuit diagram showing the construction of a wheeled hydraulic excavator which is equipped with a failure detection device according to the third embodiment, and FIG. 8 schematically illustrates the structure of a controller 30B according to the third embodiment. It should be noted the same reference numerals are used for elements similar to that of the FIGS. 1 and 3, and the explanation will focus upon the points different therefrom.

As shown in FIG. 7, a starting motor 48 is connected with the controller 30B, and the drive of the starting motor 48 is controlled thereby. As shown in FIG. 8, the ignition key switch 37 is connected with the starting motor 48 via a relay 310, and the output terminal of the changeover switch 309 is connected with the coil of the relay 310. By this structure, when the switchover circuit 303 is switched to the contact "a" side according to a failure of the traveling motor 1 while the vehicle is stationary, the coil of the relay 310 is supplied with actuating electrical energy so that the relay contact is switched to its contact "R1" side. As a result, the supply of electricity to the starting motor 48 is cut, and it is impossible to start the engine 2 even if the ignition key switch 37 is turned on.

When, in such a state, the reset switch 36 is actuated, the switchover circuit 303 is switched to the contact "b" side, and the supply of electricity to the coil of the relay 310 is intercepted. The relay contact is thus switched to the contact "R2" side, which makes possible to restart the engine 2. It should be noted that it would also be possible to restart the engine 2, as an alternative to operation of the reset switch 36, by a repairman, etc. using some apparatuses to supply an external signal of some type. In this manner, it would be impossible for an operator to restart the engine upon his own decision.

According to the third embodiment, when a failure of the traveling motor 1 is detected, the engine 2 can not be restarted. Therefore, an operator will not imprudently restart the engine 2 to drive the vehicle, and it is possible to ensure that he makes an appropriate response to the abnormal operation of the traveling motor 1.

Fourth Embodiment

Figure 9:
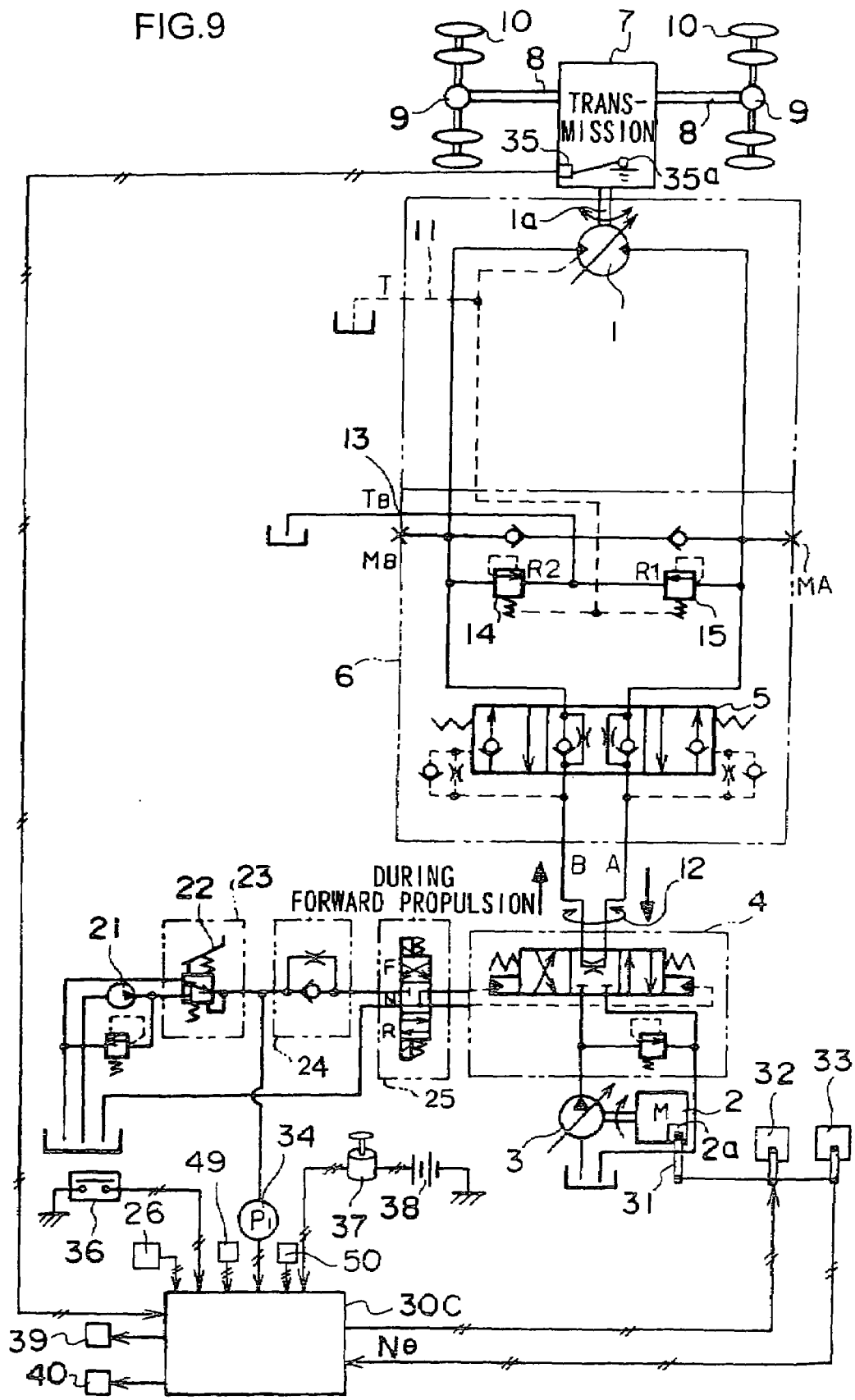
FIG. 9 is a circuit diagram showing the structure of the wheeled hydraulic excavator equipped with the failure detection device for a hydraulic motor according to the fourth embodiment of the present invention.
Figure 10:
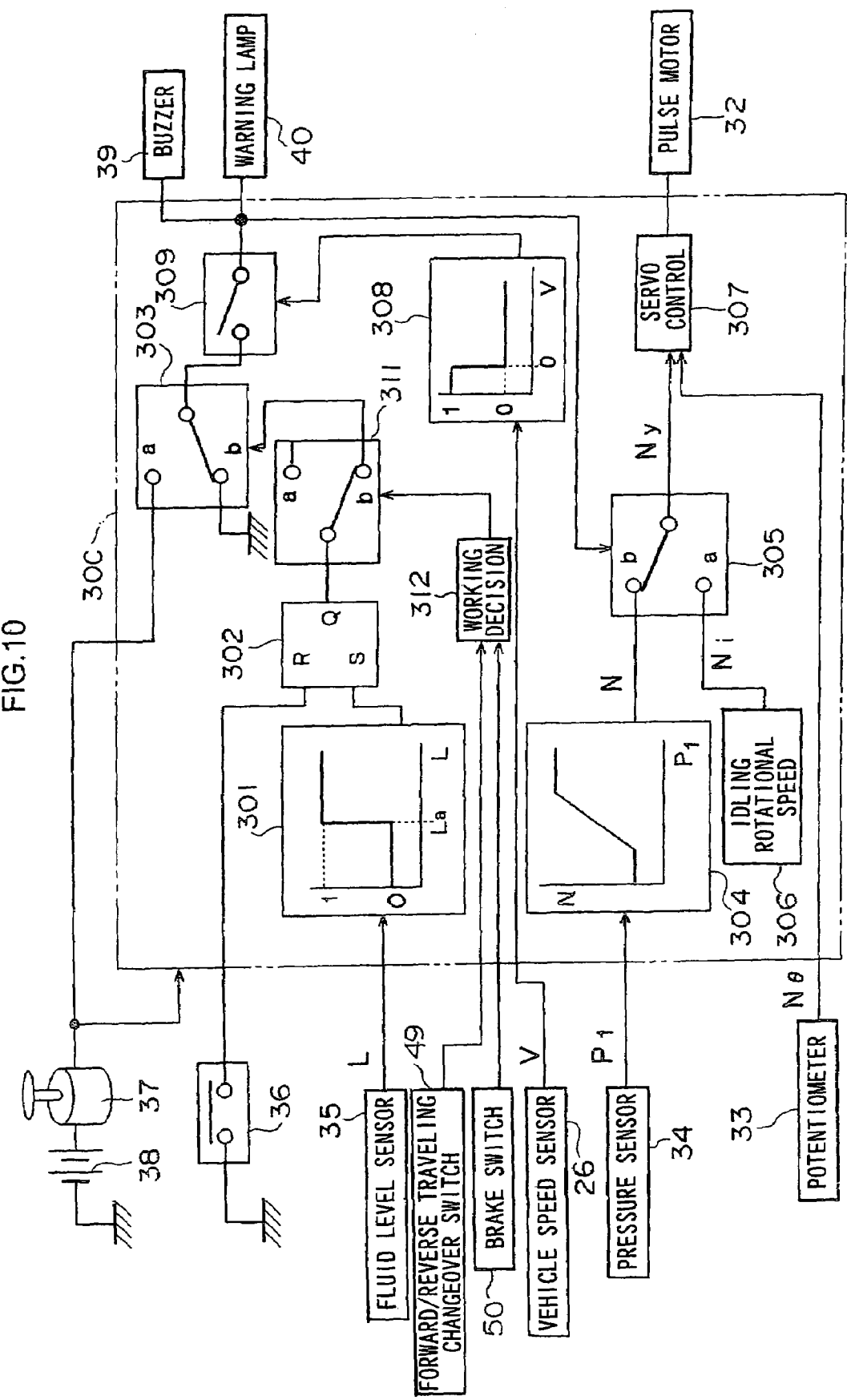
FIG. 10 schematically illustrates the details of the controller which constitutes the failure detection device according to the fourth embodiment of the present invention.

While, in the first embodiment, the engine speed is limited to the idling rotational speed when a failure of the traveling motor 1 is detected, regardless of the traveling state or the working state, in the fourth embodiment, no limitation will be imposed upon the engine speed during the working state. The fourth embodiment of the present invention will now be explained with reference to FIGS. 9 and 10. FIG. 9 is a circuit diagram showing the structure of a wheeled hydraulic excavator equipped with a failure detection device according to the fourth embodiment, and FIG. 10 schematically illustrates details of a controller 30C according to the fourth embodiment. It should be noted that the same reference numerals are used for elements similar to that of FIGS. 1 and 3, and the explanations will focus on the points different therefrom.

As shown in FIG. 9, a forward/reverse changing switch 49 for outputting a switching command to the forward/reverse switchover valve 25, and a brake switch 50 for outputting an operate command to a work brake not shown in the figures are also connected to the controller 30C. As shown in FIG. 10, a switchover circuit 311 is connected with the terminal Q of the flip-flop 302, and the switchover circuit 311 is switched according to a signal from a work detection section 312. The signals from the forward/reverse changing switch 49 and the brake switch 50 are input to the work detection section 312. The work detection section 312 sets the switchover circuit 311 to the contact "a" side when the forward/reverse switchover valve 25 is in the neutral position and also the work brake is being operated, while in other conditions, the switchover circuit 311 is switched to the contact "b" side.

In other words, the switchover circuit 311 is switched to the contact "b" in any conditions other than the working state, and the switchover circuits 303 and 305 are switched to the contact "a" side if a failure of the traveling motor 1 occurs, to restrict the engine speed to the idling rotational speed Ni. When, in such a condition, the forward/reverse switchover valve 25 is set to the neutral position in response to the operation of the forward/reverse changing switch 49, and also the work brake is operated by the operation of the brake switch 50, the switchover circuit 311 is then switched to the contact "a" side. As a result, the switchover circuits 303 and 305 are both switched to the contact "b" side to cancel the restriction of the engine speed.

According to the fourth embodiment, it is detected as to whether or not the vehicle has started the work operation according to actuation of the forward/reverse changing switch 49 and the brake switch 50. It is possible to continue working in the normal manner even when the traveling motor 1 has broken down since the restriction on the engine speed is disabled during working. It should be noted that the fourth embodiment can be applied, not only to a system which restricts the engine speed during a failure of the traveling motor 1, but also, in the same manner, to systems which control the vehicle traveling in other ways, such as by stopping the vehicle traveling, by preventing the engine from restarting, or by causing the parking brake to operate. In other words, the above restrictions upon traveling may be cancelled during working.

It would also be possible for the fluid level sensor 35 to be implemented, not as a switch, but as a sensor which detects the fluid level continuously and outputs a set signal to the flip-flop 302 when the oil level exceeds the predefined value La. Moreover, although in the above described embodiments, the buzzer sound is emitted along with the illumination of the warning lamp 40 when the traveling motor 1 has broken down, it would also be acceptable to provide one of the warning devices. Furthermore, it would be possible to flash the hazard warning lamps which are provided around the vehicle, in order to arouse the attention around the vehicle. Although, upon a failure of the traveling motor 1, the provision of warning and the restriction of the vehicle traveling have been performed at the same time, it would also be acceptable to perform only one of them. Moreover, although the driving of the traveling motor 1 is limited during a failure of the traveling motor 1, driving of other actuators, such as a swing motor, may as well be restricted.

INDUSTRIAL APPLICABILITY

While a failure detection device for a hydraulic motor has been explained in terms of application to a wheeled hydraulic excavator by way of example, it would also be possible, in the same manner, to apply the failure detection device of the hydraulic motor according to the present invention to a crawler hydraulic excavator, or to other kinds of hydraulic drive vehicles.

The invention claimed is:

1. A failure detection device for a hydraulic motor, comprising:
   a hydraulic pump that is driven by a prime mover;
   a hydraulic motor for traveling that is driven by hydraulic oil discharged from the hydraulic pump;
   a transmission that is connected with an output shaft of the hydraulic motor for traveling;
   a stopping detection device that detects that a traveling vehicle has stopped by detecting a vehicle speed;
   a fluid level detection device that detects an oil level in the transmission; and
   a warning device that issues a warning when the stopping detection device detects that the traveling vehicle has stopped, with supply of the hydraulic oil to the hydraulic motor for traveling being interrupted, and also the fluid level detection device detects that the oil level in the transmission has risen to a predetermined value or greater.

2. A failure detection device for a hydraulic motor, comprising:
   a hydraulic pump that is driven by a prime mover;
   a hydraulic motor for traveling that is driven by hydraulic oil discharged from the hydraulic pump;
   a transmission that is connected with an output shaft of the hydraulic motor for traveling;
   a stopping detection device that detects that a traveling vehicle has stopped by detecting a vehicle speed;
   a fluid level detection device that detects an oil level in the transmission; and
   a drive restriction device that restricts a driving of the hydraulic motor for traveling when the stopping detection device detects that the traveling vehicle has stopped, with supply of the hydraulic oil to the hydraulic motor for traveling being interrupted, and also the fluid level detection device detects that the oil level in the transmission has risen to a predetermined value or greater.

3. A failure detection device for a hydraulic motor according to claim 2, wherein:
   the drive restriction device is a rotational speed restriction device that restricts a rotational speed of the prime mover, and the rotational speed restriction device lowers the rotational speed of the prime mover to a predetermined rotational speed when the stopping detection device detects that the traveling vehicle has stopped, and also the fluid level detection device detects that the oil level in the transmission has risen to the predetermined value or greater.

4. A failure detection device for a hydraulic motor according to claim 2, wherein:
   the drive restriction device is a traveling prevention device that prevents the driving of the hydraulic motor for traveling, and the traveling prevention device prevents the hydraulic motor for traveling from being driven when the stopping detection device detects that the traveling vehicle has stopped, and also the fluid level detection device detects that the oil level in the transmission has risen to the predetermined value or greater.

5. A failure detection device for a hydraulic motor, comprising:
   a hydraulic pump that is driven by a prime mover;
   a hydraulic motor for traveling that is driven by hydraulic oil discharged from the hydraulic pump;
   a transmission that is connected with an output shaft of the hydraulic motor for traveling;
   a stopping detection device that detects that a traveling vehicle has stopped by detecting a vehicle speed;
   a fluid level detection device that detects an oil level in the transmission; and
   a restart prevention device that prevents a restarting of the prime mover when the stopping detection device detects that the traveling vehicle has stopped, with supply of the hydraulic oil to the hydraulic motor for traveling being interrupted, and also the fluid level detection device detects that the oil level in the transmission has risen to a predetermined value or greater.

6. A failure detection device for a hydraulic motor according to claim 2, further comprising:
   a warning device that issues a warning when the stopping detection device detects that the traveling vehicle has stopped, with supply of the hydraulic oil to the hydraulic motor for traveling being interrupted, and also the fluid level detection device detects that the oil level in the transmission has risen to the predetermined value or greater.

7. A failure detection device for a hydraulic motor according to claim 5, further comprising:
a warning device that issues a warning when the stopping detection device detects that the traveling vehicle has stopped, with supply of the hydraulic oil to the hydraulic motor for traveling being interrupted, and also the fluid level detection device detects that the oil level in the transmission has risen to the predetermined value or greater.

8. A failure detection device for a hydraulic motor according to claim 1, further comprising:
a working detection device that detects a working state, and
a warning control device that disables the warning device from issuing the warning, when the working detection device detects the working state.

9. A failure detection device for a hydraulic motor according to claim 2, further comprising:
a working detection device that detects a working state, and
a drive restriction control device that disables a drive restriction on the hydraulic motor for traveling by the drive restriction device, when the working detection device detects the working state.

10. A failure detection device for a hydraulic motor according to claim 5, further comprising:
a working detection device that detects a working state, and
a restart prevention control device that disables a restart prevention for the prime mover by the restart prevention device, when the working detection device detects the working state.

11. A failure detection device for a hydraulic motor according to claim 1, further comprising:
a reset command switch that resets the warning device.

12. A failure detection device for a hydraulic motor according to claim 2, further comprising:
a reset command switch that resets the drive restriction device.

13. A failure detection device for a hydraulic motor according to claim 5, further comprising:
a reset command switch that resets the restart prevention device.

14. A failure detection device for a hydraulic motor according to claim 1, wherein:
the warning device is reset by actuation of an ignition key switch.

15. A failure detection device for a hydraulic motor according to claim 2, wherein:
the drive restriction device is reset by actuation of an ignition key switch.

16. A failure detection device for a hydraulic motor according to claim 5, wherein:
the restart prevention device is reset by actuation of an ignition key switch.

17. A hydraulic drive vehicle, comprising:
a hydraulic pump that is driven by a prime mover;
a hydraulic motor for traveling that is driven by hydraulic oil discharged from the hydraulic pump;
a transmission that is connected with an output shaft of the hydraulic motor for traveling;
a stopping detection device that detects that the vehicle has stopped by detecting a vehicle speed;
a fluid level detection device that detects an oil level in the transmission; and
a warning device that issues a warning when the stopping detection device detects that the vehicle has stopped, with supply of the hydraulic oil to the hydraulic motor for traveling being interrupted, and also the fluid level detection device detects that the oil level in the transmission has risen to a predetermined value or greater.

18. A hydraulic drive vehicle, comprising:
a hydraulic pump that is driven by a prime mover;
a hydraulic motor for traveling that is driven by hydraulic oil discharged from the hydraulic pump;
a transmission that is connected with an output shaft of the hydraulic motor for traveling;
a stopping detection device that detects that the vehicle has stopped by detecting a vehicle speed;
a fluid level detection device that detects an oil level in the transmission; and
a drive restriction device that restricts a driving of the hydraulic motor for traveling when the stopping detection device detects that the vehicle has stopped, with supply of the hydraulic oil to the hydraulic motor for traveling being interrupted, and the fluid level detection device detects that the oil level in the transmission has risen to a predetermined value or greater.

19. A hydraulic drive vehicle, comprising:
a hydraulic pump that is driven by a prime mover;
a hydraulic motor for traveling that is driven by hydraulic oil discharged from the hydraulic pump;
a transmission that is connected with an output shaft of the hydraulic motor for traveling;
a stopping detection device that detects that the vehicle has stopped by detecting a vehicle speed;
a fluid level detection device that detects an oil level in the transmission; and
a restart prevention device that prevents the prime mover from restarting when the stopping detection device detects that the vehicle has stopped, with supply of the hydraulic oil to the hydraulic motor for traveling being interrupted, and also that the fluid level detection device detects that the oil level in the transmission has risen to a predetermined value or greater.

* * * * *